United States Patent
Ishii et al.

(10) Patent No.: US 11,086,151 B2
(45) Date of Patent: Aug. 10, 2021

(54) VIEWING ANGLE CONTROL DEVICE, MANUFACTURING METHOD THEREOF AND DISPLAY PANEL

(71) Applicant: Panasonic Liquid Crystal Display Co., Ltd., Hyogo (JP)

(72) Inventors: Masahiro Ishii, Hyogo (JP); Tetsuo Fukami, Hyogo (JP); Yukinori Kayama, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/796,400

(22) Filed: Feb. 20, 2020

(65) Prior Publication Data

US 2021/0191167 A1    Jun. 24, 2021

(30) Foreign Application Priority Data

Dec. 20, 2019   (CN) .......................... 201911328503.0

(51) Int. Cl.
  *G02F 1/1343*   (2006.01)
  *G02F 1/1337*   (2006.01)
  *G02F 1/1339*   (2006.01)
  *G02F 1/13*     (2006.01)

(52) U.S. Cl.
  CPC .......... *G02F 1/1323* (2013.01); *G02F 1/1337* (2013.01); *G02F 1/1339* (2013.01); *G02F 1/13439* (2013.01); *G02F 1/134309* (2013.01)

(58) Field of Classification Search
  CPC .... G02F 1/1323; G02F 1/1345; G02F 1/1343; G02F 1/134309; G02F 1/1349; G02F 1/13452; G02F 1/1337; G02F 1/1339; G02F 2201/40
  See application file for complete search history.

(56) References Cited

U.S. PATENT DOCUMENTS

2008/0084471 A1    4/2008  Yabuta et al.
2019/0086740 A1*   3/2019  Bae .................. G02F 1/134336

FOREIGN PATENT DOCUMENTS

CN        101036085       9/2007

* cited by examiner

*Primary Examiner* — Thoi V Duong
(74) *Attorney, Agent, or Firm* — Wenderoth, Lind & Ponack, L.L.P.

(57) ABSTRACT

Provide are a viewing angle control device, a method of manufacturing the same, and a display panel. The viewing angle control device includes a first substrate and a second substrate disposed opposite each other; a first electrode and a second electrode disposed respectively on inner surfaces of the first substrate and the second substrate opposite each other; a first alignment film disposed on an inner surface of the first electrode opposite the second electrode; and a liquid crystal layer disposed between the first substrate and the second substrate. A groove is provided in a region of the inner surface of the first electrode, and a conductor that is electrically connected to the first electrode and has lower resistivity than the first electrode is provided at the groove or at a periphery of the groove.

17 Claims, 6 Drawing Sheets

VIEWING ANGLE CONTROL DEVICE, MANUFACTURING METHOD THEREOF AND DISPLAY PANEL

CROSS-REFERENCE TO RELATED APPLICATION

This application is based on and claims priority of Chinese application No. 201911328503.0 filed on Dec. 20, 2019. The entire disclosure of the above-identified application, including the specification, drawings and claims is incorporated herein by reference in its entirety.

TECHNICAL FIELD

The present disclosure relates to the technical field of displays, and in particular to a viewing angle control device, a manufacturing method thereof, and a display panel.

BACKGROUND

Electronic apparatuses having displays, such as cellular phones and portable personal computers, have gained a wider application over recent years. There is a problem, however, that when used in a public place, these electronic apparatuses might have private information displayed on them, such as personal information and a confidential document, which can be seen by a person in the vicinity of them.

To solve that problem, a technique is provided that sets an electronic apparatus under normal conditions to be in a wide viewing angle display mode which allows a person to view normally displayed contents from both a front side and an oblique side of the display device, and switches the electronic apparatus, when used in a public place, to be in a narrow viewing angle display mode which allows a person to view normally displayed contents only from the front side of the display device.

For example, Patent Document 1 (CN200580033721.1) provides a display device for realizing the aforementioned technique. The display device includes a viewing angle control unit 12 that is disposed to overlap a main liquid crystal display unit 14. In the viewing angle control unit 12, a liquid crystal layer 23 is disposed between a pair of first electrodes 26 and 27. In the narrow viewing angle display mode, when a voltage is applied to the pair of first electrodes 26 and 27, the liquid crystal molecules in the liquid crystal layer 23 are rotated, and the polarization of image light from the main liquid crystal display unit 14, which is linearly polarized light, is disturbed. As a result, no image is visible when a person views the display device from the oblique side. On the other hand, when a person views the display device from the front side, the long-axis direction of the liquid crystal molecules in the liquid crystal layer 23 is the same as the polarization direction of image light from the main liquid crystal display unit 14. Therefore, image light from the main liquid crystal display unit 14 passes through the viewing angle control unit 12 without being affected by it, and thus images can be viewed from the front side.

To control the initial alignment of the liquid crystal molecules in the liquid crystal layer 23 in the viewing angle control unit 12, it is necessary to apply an alignment film coating liquid and cure it to form alignment films 24, 25. However, the alignment film coating liquid is likely to overflow, and when it reaches a sealing member or a power supply terminal, the sealing member can become less adhesive, and the conductivity of the power supply terminal can decrease.

SUMMARY

Problem to be Solved

The present disclosure provides a viewing angle control device that can reduce overflow of the alignment film coating liquid, a method of manufacturing the same, and a display panel.

Solution to the Problem

To accomplish that objective, one aspect of the present disclosure describes a viewing angle control device comprising: a first substrate and a second substrate disposed so as to oppose each other; a first electrode and a second electrode disposed respectively on inner surfaces of the first substrate and the second substrate so as to oppose each other; a first alignment film disposed on an inner surface of the first electrode; and a liquid crystal layer disposed between the first substrate and the second substrate, wherein a groove is provided in a region of the inner surface of the first electrode, and a conductor that is electrically connected to the first electrode and has lower resistivity than the first electrode is provided at the groove or at a periphery of the groove.

Another aspect of the present disclosure describes a display panel comprising: the viewing angle control device; and an image display device configured to display an image and overlap the viewing angle control device.

Yet another aspect of the present disclosure describes a manufacturing method of a viewing angle control device, the viewing angle control device comprising: a first substrate and a second substrate disposed so as to oppose each other; a first electrode and a second electrode disposed respectively on inner surfaces of the first substrate and the second substrate so as to oppose each other; an alignment film disposed on an inner surface of the first electrode; and a liquid crystal layer disposed between the first substrate and the second substrate, wherein the manufacturing method comprises: forming a groove in a region of the inner surface of the first electrode; and applying an alignment film coating liquid to a region of the inner surface of the first electrode on an inner side of the groove to form the alignment film, and forming a conductor that is electrically connected to the first electrode and has lower resistivity than the first electrode, at the groove or at a periphery of the groove.

Effect Achieved

According to the aspects of the present disclosure, a groove is provided in a region of an inner surface of the first electrode, so it is possible to inhibit the coating liquid from overflowing and thus avoid the problem that the sealing member becomes less adhesive and the terminal becomes poor in conductivity. Since a conductor that is electrically connected to the first electrode and has lower resistivity than the first electrode is provided at the groove or at a periphery of the groove, it is possible to suppress an increase in the resistance caused by the groove and thus ensure voltage uniformity of the first electrode.

BRIEF DESCRIPTION OF THE DRAWINGS

For the purpose of explaining the technical solutions of examples of the present disclosure more clearly, drawings to be used in the description of the examples will be briefly described.

DETAILED DESCRIPTION

The technical solutions of examples of the present disclosure will be described clearly and completely with reference to the drawings. The examples to be described herein are only some of examples of the present disclosure, not all examples of the present disclosure. Any other example that a person skilled in the art obtains on the basis of the examples disclosed herein but without making creative efforts falls within the scope of the present disclosure.

Figure 1:
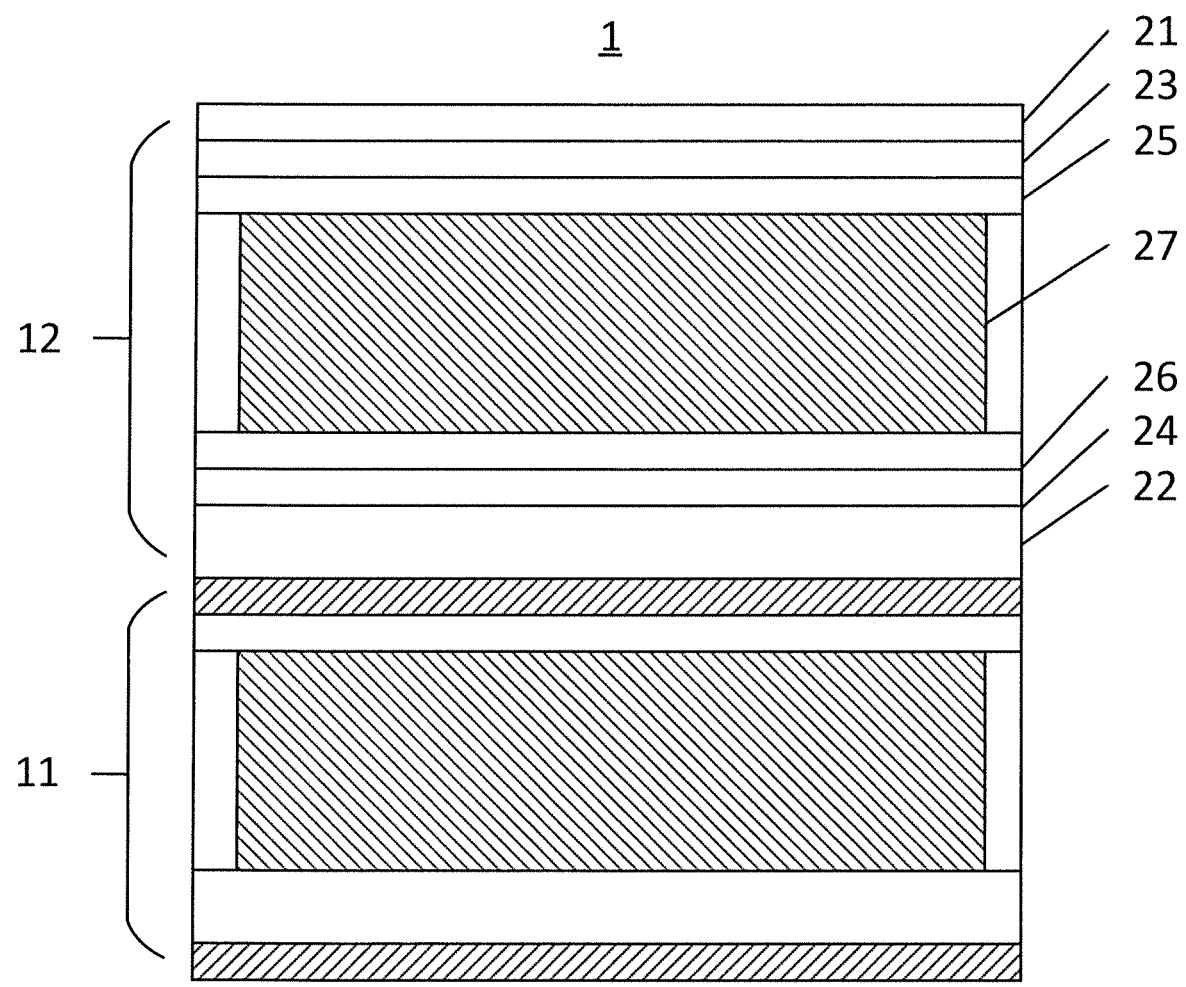
FIG. 1 shows a display panel according to an embodiment of the present disclosure.

FIG. 1 shows a display panel 1 according to an embodiment of the present disclosure. The display panel 1 includes an image display device 11 and a viewing angle control device 12 that is disposed to overlap the image display device 11.

The image display device 11 may be a well-known liquid crystal display device, so a detailed description of its configuration is omitted herein. A self-luminous display device such as an organic EL (electroluminescence) display device or a plasma display device may also be used.

The viewing angle control device 12 includes a first substrate 21, a first electrode 23, a first alignment film 25, a liquid crystal layer 27, a second alignment film 26, a second electrode 24, and a second substrate 22. The first substrate 21 and the second substrate 22 are disposed so as to oppose each other. The first electrode 23 and the second electrode 24 oppose each other, and are disposed respectively on inner surfaces of the first substrate 21 and the second substrate 22, and may be transparent electrodes formed of, for example, ITO (indium tin oxide). The first alignment film 25 is disposed on an inner surface of the first electrode 23, and the second alignment film 26 is disposed on an inner surface of the second electrode 24, the first alignment film 25 and the second alignment film 26 opposing each other. The first and second alignment films may be formed of polyimide or the like. The liquid crystal layer 27 is disposed between the first substrate 21 and the second substrate 22. Alternatively, the viewing angle control device 12 can be provided with only one of the first alignment film 25 and the second alignment film 26.

In the following description, the first substrate 21 and the second substrate 22 may be collectively referred as the substrates, the first electrode 23 and the second electrode 24 may be collectively referred as the electrodes, and the first alignment film 25 and the second alignment film 26 may be collectively referred as the alignment films.

The initial alignment directions of liquid crystal molecules in the liquid crystal layer 27 are decided by the first alignment film 25 and the second alignment film 26. When a control unit (not shown) applies a voltage to the first electrode 23 and the second electrode 24, the alignment directions of almost all the liquid crystal molecules in the liquid crystal layer 27 are changed, thereby realizing the viewing angle control.

The thickness of the substrates 21 and 22 can range from 0.3 mm to 1.0 mm, the thickness of the electrodes 23 and 24 can range from 20 nm to 150 nm, and the thickness of the alignment films 25 and 26 can range from 50 nm to 300 nm.

Figure 2:
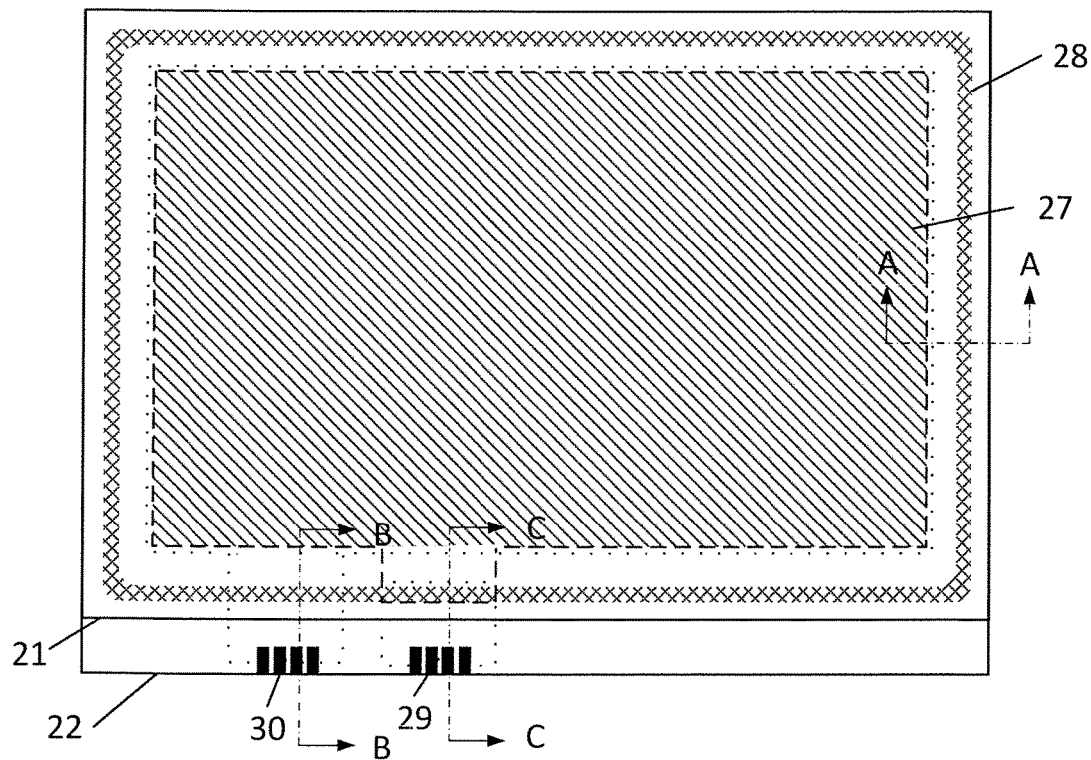
FIG. 2 is a schematic top view of a viewing angle control device according to an embodiment of the present disclosure.

FIG. 2 is a schematic top view of the viewing angle control device 12 according to an embodiment of the present disclosure. In FIG. 2, the first electrode 23, the second electrode 24, the liquid crystal layer 27, and a sealing member 28 to be described later are represented in a perspective manner. Specifically, as shown in FIG. 2, the coverage of the first electrode 23 is indicated by a broken line frame, the coverage of the second electrode 24 is indicated by a dotted line frame, the liquid crystal layer 27 is indicated by hatching, and the sealing member 28 is indicated by a lattice frame. As also shown in FIG. 2, the rectangular frame of the dotted line indicating the second electrode 24 is larger than the rectangular frame of the broken line indicating the first electrode 23, for the purpose of facilitating observation. However, in practical applications, the first electrode 23 and the second electrode 24 usually coincide with each other.

As shown in FIG. 2, the viewing angle control device 12 further includes: a sealing member 28 disposed between the first substrate 21 and the second substrate 22 and surrounding the liquid crystal layer 27; a power supply terminal 29 that supplies power to the first electrode 23; and a power supply terminal 30 that supplies power to the second electrode 24. As illustrated in the A-A cross section of FIG. 4, the sealing member 28 is directly bonded to the substrates 21 and 22, so as to form a closed space. As shown in FIG. 5 and FIG. 6, both the power supply terminals 29 and 30 are formed on the second substrate 22. The power supply terminal 29 is electrically connected to the first electrode 23 via the sealing member 28, which is doped with conductive beads and thus has electrical conductivity, and a wire 60, which is formed between the sealing member 28 and the second substrate 22. The power supply terminal 30 is electrically connected to the second electrode 24 directly.

As shown in FIG. 5, in B-B cross section provided with the power supply terminal 30, the sealing member 28 is bonded to the first substrate 21 directly, while the second electrode 24 is sandwiched between the sealing member 28 and the second substrate 22. As shown in FIG. 6, in C-C cross section provided with the power supply terminal 29, the first electrode 23 is extended to a position facing the sealing member 28, and sandwiched between the sealing member 28 and the first substrate 21. Moreover, the wire 60 is sandwiched between the sealing member 28 and the second substrate 22. However, the present disclosure is not limited to this, and the sealing member 28 may be a non-conductive member and the first electrode 23 can be electrically connected to the power supply terminal 29 in another way.

Figure 4:
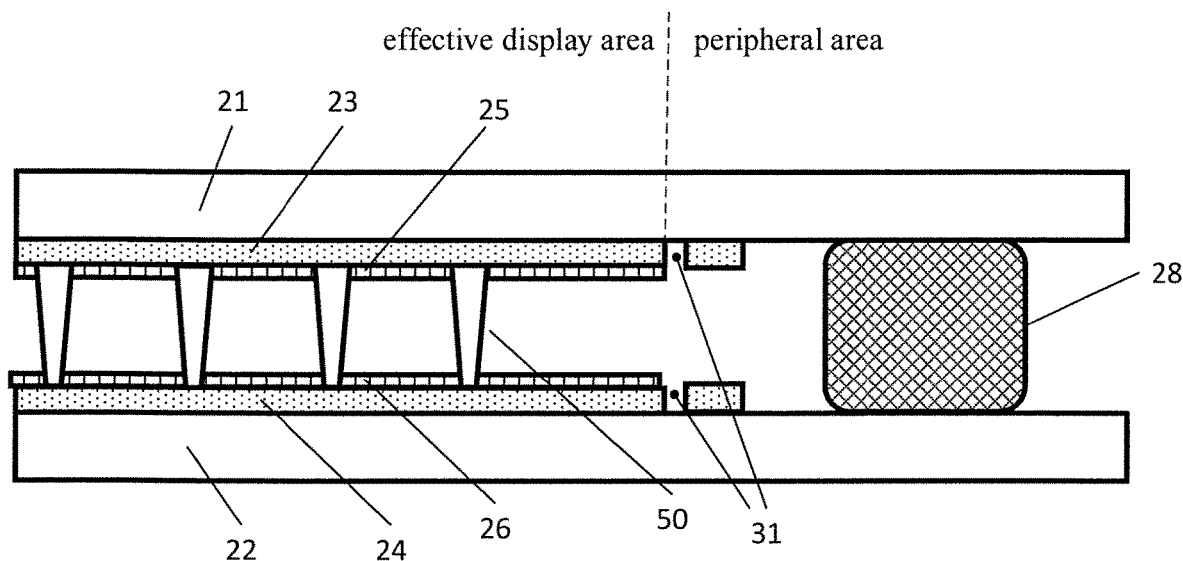
FIG. 4 is a cross-sectional view of the viewing angle control device shown in FIG. 2, taken along the line A-A.
Figure 5:
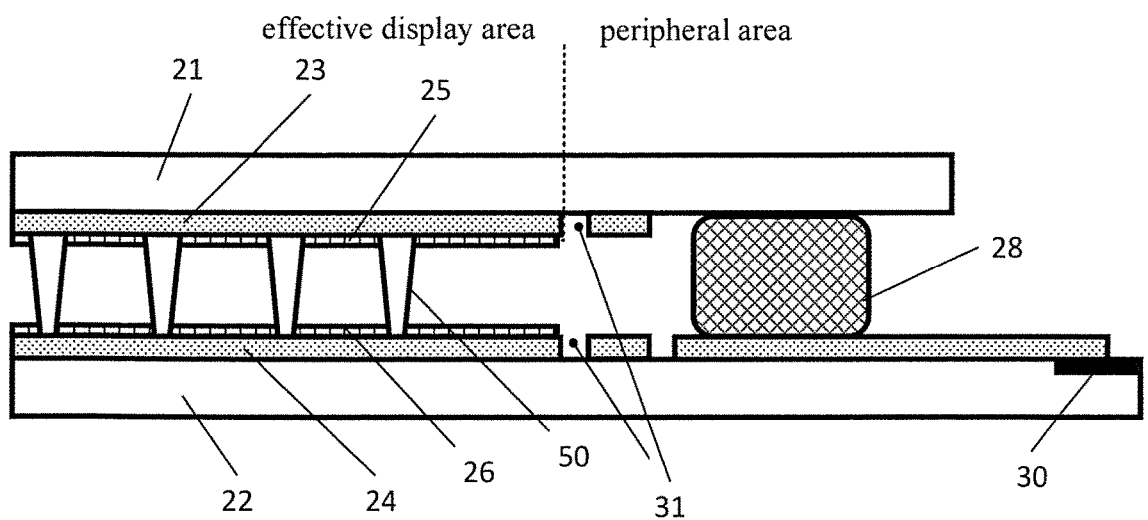
FIG. 5 is a cross-sectional view of the viewing angle control device shown in FIG. 2, taken along the line B-B.
Figure 6:
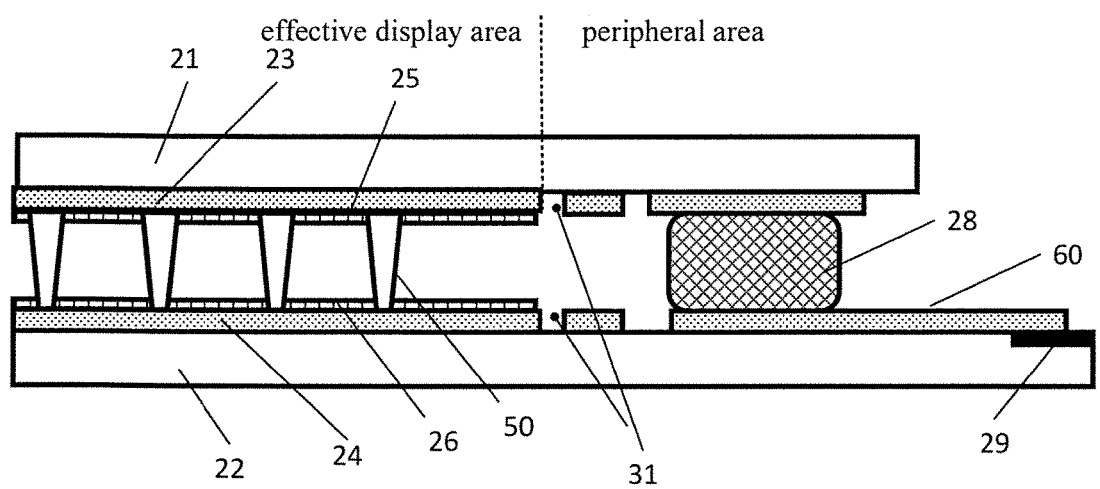
FIG. 6 is a cross-sectional view of the viewing angle control device shown in FIG. 2, taken along the line C-C.

Furthermore, as shown in FIGS. 4-6, the viewing angle control device 12 can include a support 50 which is disposed between the electrodes 23 and 24 to form a gap between the electrodes.

The inventors have discovered that, for the above described viewing angle control device 12, by providing a groove on an inner surface of the electrodes 23 and 24, overflow of the alignment film coating liquid can be suppressed. Specifically, the thicknesses of the electrodes 23 and 24 are usually on a nanometer scale, and when forming a groove in such an electrode, the interfacial tension between the alignment film coating liquid such as polyimide and the electrode would be increased at the groove, which could allow the flowing of the coating liquid stop. As such, the alignment film coating liquid is restricted inside an area located on an inner side of the groove, or more accurately the outer edge of the groove. In other words, the groove is located on an outer side of formed alignment films 25 and 26 in the inner surface of the electrodes 23 and 24. The groove may be of any depth, so long as the depth is less than or equal to the thickness of the electrodes 23 and 24. The shape and width of the groove are not limited either. Furthermore, when only one of the alignment films 25 and 26 is provided, a groove is faulted on an inner surface of the electrode provided with the alignment film.

The inventors have also discovered that a high resistance occurs in the portion of the electrodes provided with a groove, which would adversely affect voltage uniformity of the electrodes 23 and 24. To cope with that problem, a conductor connected to the electrodes 23 and 24 electrically and having resistivity lower than that of the electrodes 23 and 24 is provided at the groove or at a periphery of the groove, thereby suppressing an increase in the resistance caused by the groove and thus ensuring voltage uniformity of the electrodes 23 and 24. The material, shape, dimensions, position, and the like of the conductor are not limited. For example, the conductor can be a metal wire formed of, for example, copper or aluminum on an inner surface of the electrodes 23 and 24.

In order for the groove and the conductor not to affect image display on the image display device 11, it is preferable that both the groove and the conductor are disposed in the peripheral area shown in FIGS. 4-6, which is outside the display area (facing the effective display area shown in FIGS. 4-6) of the image display device 11.

The manner in which the groove and the conductor are arranged will be described in detail with reference to FIGS. 3-12, using the first electrode 23 with the groove and the conductor as an example. The second electrode 24 can be provided with the groove and the conductor in the same manner as the first electrode 23.

Example 1

Figure 3:
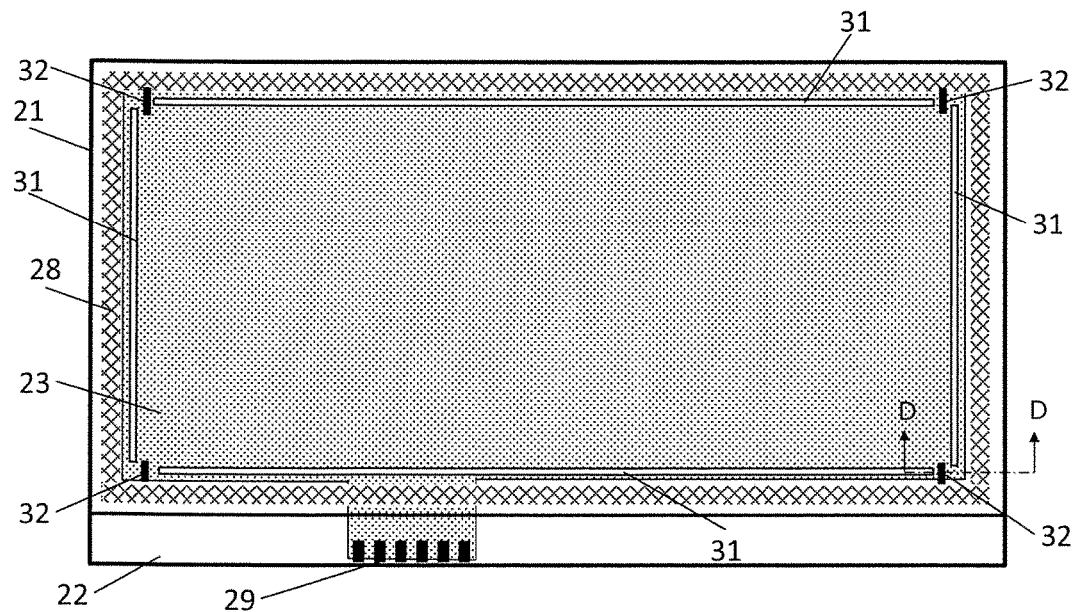
FIG. 3 is a schematic top view of an example of the arrangement of the groove and the conductor in the first electrode.

FIG. 3 is a schematic top view of an example of the arrangement of the groove and the conductor in the first electrode 23. In FIG. 3, the first electrode 23, the groove 31, the conductor 32 (the first conductor, the first conducting portion), and the sealing member 28 are represented in a perspective manner.

As shown in FIG. 3, one groove 31 is provided at a portion of each of the four sides of the rectangular-shaped first electrode 23 that is close to the edge, and the four grooves 31 extend respectively along the four sides of the sealing member 28. Therefore, it is possible to suppress the overflow of the alignment film coating liquid in the directions of the four sides of the first electrode 23.

A conductor 32 is provided in a region of each of the four corners of the first electrode 23 where the groove 31 is not formed, around an end of the groove 31. Therefore, it is possible to suppress an increase in the resistance caused by the groove 31, thereby increasing voltage uniformity of the first electrode 23.

Figure 7:
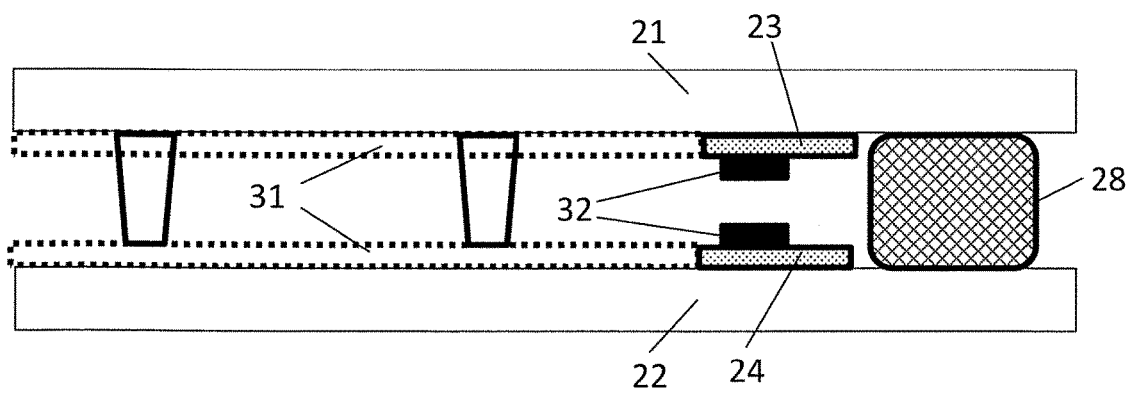
FIG. 7 is a cross-sectional view of the viewing angle control device shown in FIG. 3, taken along the line D-D.

As shown in FIGS. 4-6, the groove 31 is formed outside the first alignment film 25 on the inner surface of the first electrode 23, and has a depth equal to the thickness of the first electrode 23. As shown in FIG. 7, in the D-D cross section, the dotted box refers to an area in which part of the electrode 23 or 24 is removed to form the groove 31, and the conductor 32 is disposed in a region around an end of the groove 31 on the inner surfaces of the electrodes 23 and 24.

Example 2

Figure 8:
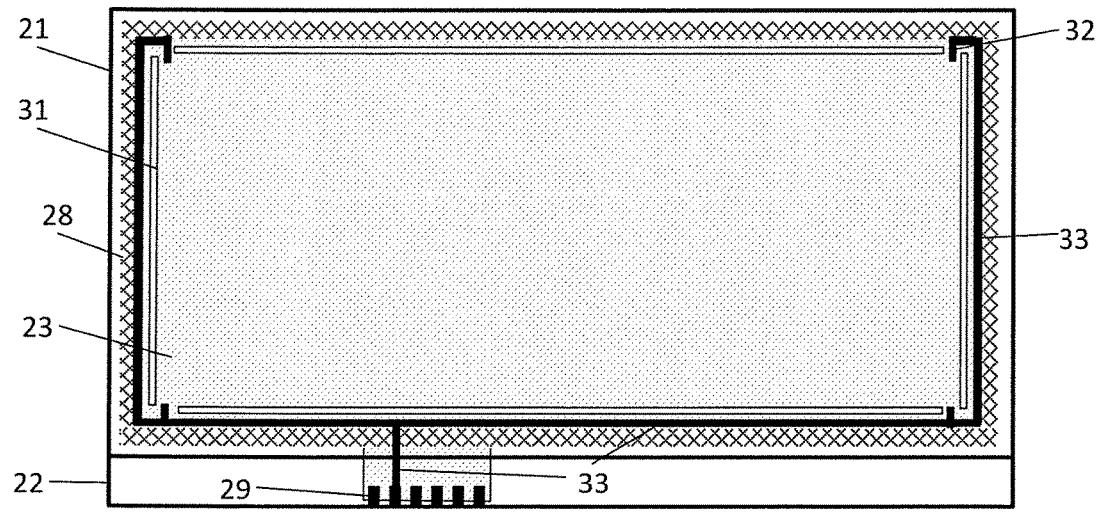
FIG. 8 is a schematic top view of another example of the arrangement of the groove and the conductor in the first electrode.

FIG. 8 is a schematic top view of another example of the arrangement of the groove and the conductor for the first electrode 23. In FIG. 8, the first electrode 23, the groove 31, the conductor 32 (the first conductor, the first conducting portion), the conductor 33 (the first conductor, the third conducting portion), and the sealing member 28 are represented in a perspective manner.

As shown in FIG. 8, the arrangement of the groove and the conductors in this example differs from that shown in FIG. 3 in that the conductor 33 is provided, which is a further conductor provided for the first electrode 23. The conductor 33 is disposed outside the groove 31, and extends along the groove 31. Furthermore, the conductor 33 is connected with a plurality of the conductors 32, and is also connected to the power supply terminal 29.

With the conductor 33, the power supply capability is improved, which further improves voltage uniformity of the first electrode 23.

Example 3

Figure 9:
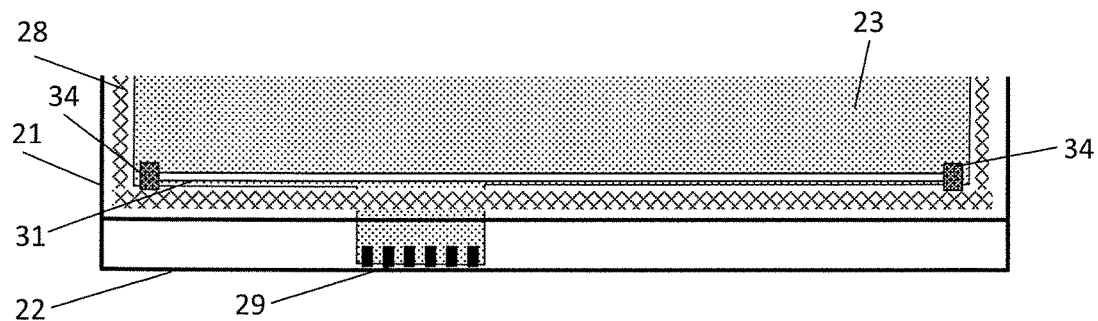
FIG. 9 is a partial schematic top view of another example of the arrangement of the groove and the conductor in the first electrode.

FIG. 9 is partial schematic top view of another example of the arrangement of the groove and the conductor for the first electrode 23. In FIG. 9, the first electrode 23, the groove 31, the conductor 34 (the second conductor), and the sealing member 28 are represented in a perspective manner.

As shown in FIG. 9, the arrangement of the groove 31 and the conductor 34 in this example differs from that shown in FIG. 3 in that there is no conductor 32 in a region of each of the four corners of the first electrode 23. Instead, the conductor 34 is disposed at each of the four corners of the first electrode 23 such that at least part of the conductor 34 overlaps the groove 31. The conductors 34 are formed across the groove 31, and a portion of the conductor 34 overlapping the groove 31 protrudes toward the side of the second electrode 24 with respect to the inner surface of the first electrode 23.

With the conductor 34, it is possible to inhibit the alignment film coating liquid from overflowing from the gap between the groove 31 and the conductor 34.

Example 4

Figure 10:
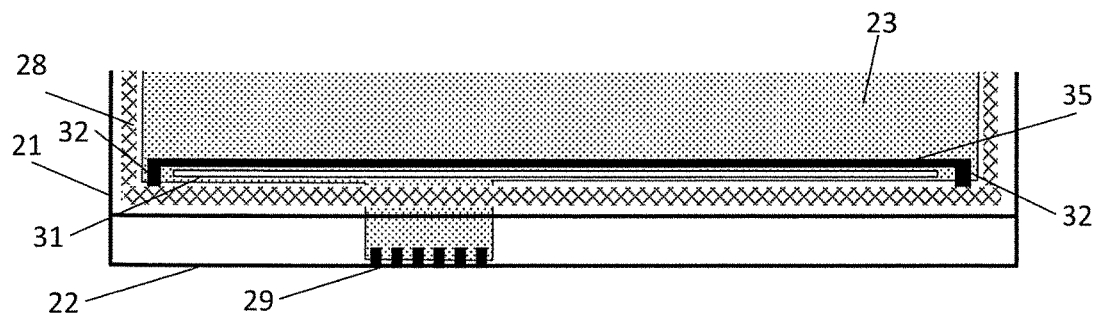
FIG. 10 is a partial schematic top view of another example of the arrangement of the groove and the conductor in the first electrode.

FIG. 10 is partial schematic top view of another example of the arrangement of the groove and the conductor for the first electrode 23. In FIG. 10, the first electrode 23, the groove 31, the conductor 32 (the first conductor, the first conducting portion), the conductor 35 (the first conductor, the fourth conducting portion), and the sealing member 28 are represented in a perspective manner.

As shown in FIG. 10, the arrangement of the groove and the conductor in this example differs from that shown in FIG. 3 in that the conductor 35 is provided, which is a further conductor provided for the first electrode 23. The conductor 35 is disposed on an inner side of the groove 31, and extends along part of the sealing member 28. Furthermore, the conductor 35 protrudes toward the side of the second electrode 24 with respect to the alignment film 25, and is connected with two conductors 32.

Since the conductor 35 is disposed on an inner side of the groove 31, it is possible to better block the alignment film coating liquid. Besides, since the conductors 32 are connected by the conductor 35, the voltage uniformity of the first electrode 23 can be improved. Since the closer to the center of the display area, the worse the voltage uniformity of the first electrode becomes, disposing the conductor 35 on an inner side of the groove 31 can further improve voltage uniformity of the first electrode.

Example 5

Figure 11:
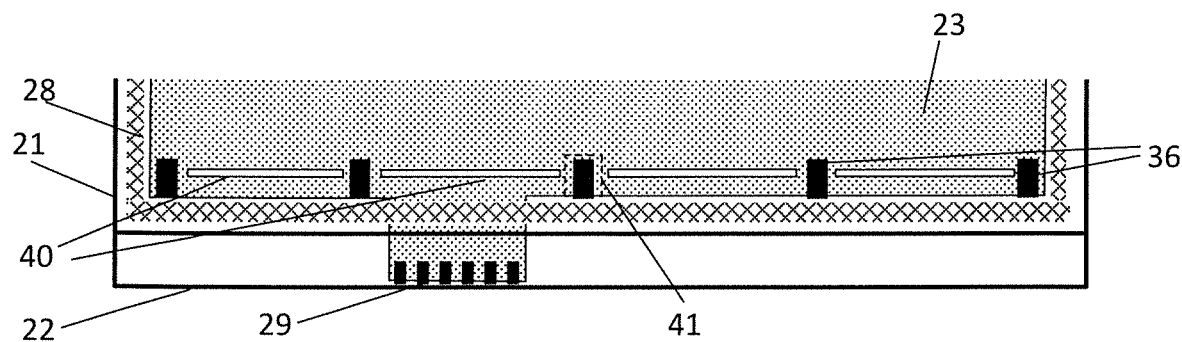
FIG. 11 is a partial schematic top view of another example of the arrangement of the groove and the conductor in the first electrode.

FIG. 11 is partial schematic top view of another example of the arrangement of the groove and the conductor for the first electrode 23. In FIG. 11, the first electrode 23, the groove 40, the interruption portion 41, the conductor 36 (the first conductor, the second conducting portion), and the sealing member 28 are represented in a perspective manner.

As shown in FIG. 11, a plurality of grooves 40 arranged along the sealing member 28 are disposed respectively at portions of the four sides of the first electrode 23 that are close to the edges. An interruption portion 41 is formed between two of the adjacent grooves 40, and the two adjacent grooves 40 and the interruption portion 41 are on a straight line along the sealing member 28. The interruption portion 41 is provided with the conductor 36.

The spaced grooves and the conductor 36 provided between the grooves make it possible to suppress the overflow of the alignment film coating liquid, and make it possible to inhibit an increase in the resistance caused by the groove 40, thereby improving voltage uniformity of the first electrode 23.

Example 6

Figure 12:
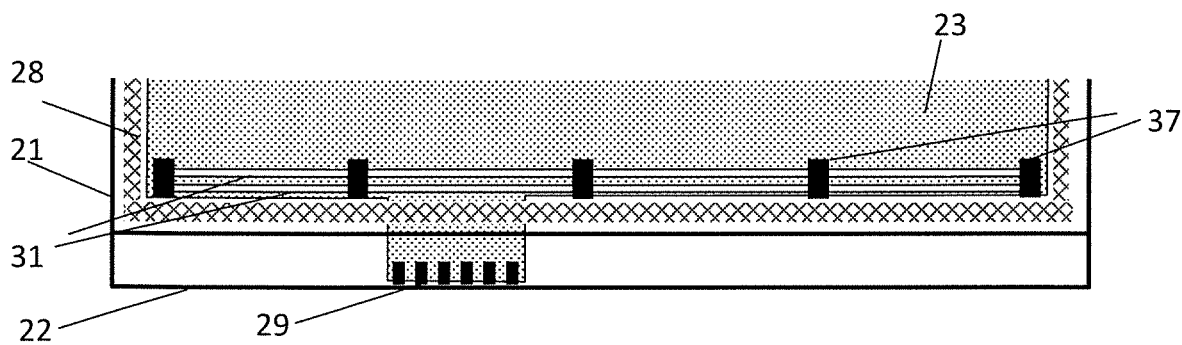
FIG. 12 is a partial schematic top view of another example of the arrangement of the groove and the conductor in the first electrode.

FIG. 12 is partial schematic top view of another example of the arrangement of the groove and the conductor in the first electrode 23. In FIG. 12, the first electrode 23, the groove 31, the conductor 37 (the second conductor), and the sealing member 28 are represented in a perspective manner.

As shown in FIG. 12, a plurality of (two in the figure) grooves 31 arranged along the sealing member 28 are disposed respectively at portions of the four sides of the first electrode 23 that are close to the edges. The first electrode 23 is provided with a plurality of (five in the figure) conductors 37 at least part of which overlaps the groove 31. The conductors 37 are formed across the groove 31, and a portion of the conductor 37 overlapping the groove 31 protrudes toward the side of the second electrode 24 with respect to the inner surface of the first electrode 23. Two of the conductors 37 are disposed at both ends of the groove 31.

As such, it is possible to suppress the overflow of the alignment film coating liquid, and to improve voltage uniformity of the first electrode 23. Furthermore, since the conductor is generally very thin, it is possible that the conductor cannot improve uniformity in the voltages if only one conductor is provided and it breaks. Such risk can be reduced by providing a plurality of conductors.

Example 7

Figure 13:
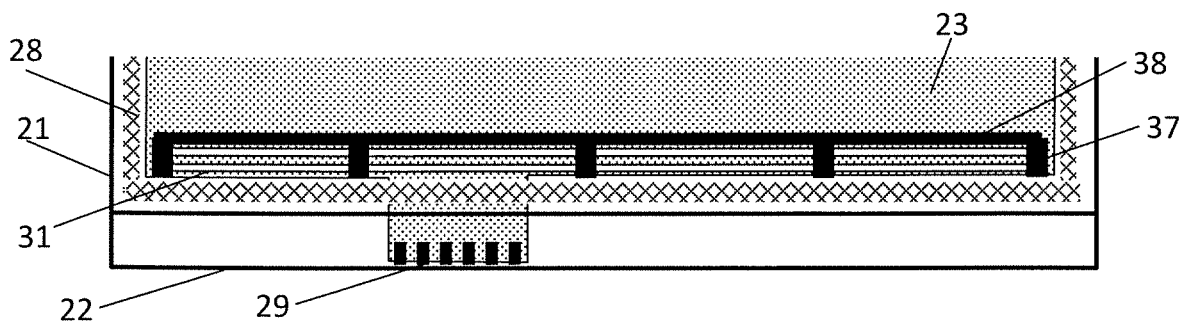
FIG. 13 is a partial schematic top view of another example of the arrangement of the groove and the conductor in the first electrode.

FIG. 13 is partial schematic top view of another example of the arrangement of the groove and the conductor in the first electrode 23. In FIG. 13, the first electrode 23, the groove 31, the conductor 37 (the second conductor), the conductor 38 (the first conductor, the fourth conducting portion), and the sealing member 28 are represented in a perspective manner.

As shown in FIG. 13, the arrangement of the groove and the conductors in this example differs from that shown in FIG. 12 in that the conductor 38 is provided, which is a further conductor provided to the first electrode 23. The conductor 38 is disposed on an inner side of the groove 31, extends along part of the sealing member 28, and protrudes toward the side of the second electrode 24 with respect to the alignment film 25. Furthermore, the conductor 38 is connected with a plurality of conductors 37.

Since the conductor 38 is disposed on an inner side of the groove 31, it is possible to better block the alignment film coating liquid. Besides, since the conductors 37 are connected by the conductor 38, voltage uniformity of the first electrode can be further improved. Since the closer to the center of the display area, the worse the voltage uniformity of the first electrode becomes, disposing the conductor 38 on an inner side of the groove 31 can further improve voltage uniformity of the first electrode 23.

In the above description, different arrangements of the groove and conductor have been illustrated. However, the present disclosure is not limited to these examples, and the arrangements in the examples can be varied and/or combined in different ways. Optionally, a groove may not be provided for each of the four sides of the first electrode 23, but may be provided for part of the four sides of the first electrode 23. Optionally, a plurality of grooves extending along part of the sealing member 28 may be provided for each of the four sides of the first electrode. When providing two or more grooves, the conductor 33, 35 or 38 can be disposed between the two adjacent grooves, and the conductor 34 or 37 can partially overlap all the grooves or part of them.

The conductor 32 as the first conducting portion, the conductor 36 as the second conducting portion, the conductors 33, 35, 38 as the third conducting portion, the conductors 35, 38 as the fourth conducting portion, and the conductors 34, 37 as the second conductor can be combined freely, and their number can be set freely. Also, the respective conductors can be connected or disconnected, and the conductor and the power supply terminal can be connected or disconnected.

The arrangements of the groove and the conductor for the four sides of the first electrode may be the same, or be different depending on requirements.

The present disclosure also provides a manufacturing method of the above described viewing angle control device. After preparing the substrates 21, 22 and the electrodes 23, 24, the method comprises: forming a groove at an edge of an inner surface of the first electrode in the same way as described in the above examples; and applying the alignment film coating liquid to a region of the inner surface of the first electrode on an inner side of the groove to form an alignment film, and forming a conductor at the groove or at a periphery of the groove in the same way as described in the above examples. The groove may be formed by for example etching.

In examples 3, 6 and 7, the conductor and groove overlap, so the groove must be formed ahead of the forming of the conductor. In the other examples, however, the conductor is disposed at a distance from the groove. So, the groove may be formed before, simultaneously with, or after the conductor. It is preferable that the forming of the first electrode and the forming of the groove are concurrent for the benefit of saving time and costs.

In the disclosure, the groove is provided in a region of the inner surface of the electrode, which makes it possible to suppress the overflow of the alignment film coating liquid and thus inhibit a decrease in adhesiveness of the sealing member and deterioration in conductivity of the power supply terminal. Further, providing a conductor that is electrically connected to the electrode and has lower resistivity than the electrode or the periphery of the groove, inhibits an increase in the resistance caused by the groove, thereby ensuring voltage uniformity of the electrode.

The foregoing description relates to exemplary embodiments of the present disclosure, but the scope of protection covered by the present disclosure is not limited thereto. A variation or replacement that a person skilled in the art can easily think of on the basis of the present disclosure falls within the scope of protection covered by the present disclosure. Therefore, the scope of protection covered by the present disclosure should be determined by the claims.

What is claimed is:

1. A viewing angle control device comprising:
   a first substrate and a second substrate disposed so as to oppose each other;
   a first electrode and a second electrode respectively disposed on inner surfaces of the first substrate and the second substrate so as to oppose each other;
   a first alignment film disposed on an inner surface of the first electrode; and
   a liquid crystal layer disposed between the first substrate and the second substrate,
   wherein a groove is provided in a region of the inner surface of the first electrode, and a conductor, which is electrically connected with the first electrode and has a lower resistivity than the first electrode, is provided at the groove or at a periphery of the groove, and
   the groove is provided in a region of the inner surface of the first electrode on an outer side of the first alignment film.

2. The viewing angle control device according to claim 1, further comprising a sealing member disposed between the first substrate and the second substrate and surrounding the liquid crystal layer,
   wherein the groove extends along part of the sealing member on an outer side of the first alignment film.

3. The viewing angle control device according to claim 2, wherein
   the groove is one of a plurality of grooves extending along the part of the sealing member on an outer side of the first alignment film.

4. The viewing angle control device according to claim 1, wherein
   the conductor is a metal wire formed on the inner surface of the first electrode.

5. The viewing angle control device according to claim 4, wherein
   the metal wire is formed of copper or aluminum.

6. The viewing angle control device according to claim 1, wherein
   the conductor comprises a first conductor disposed in a region where the groove is not formed.

7. The viewing angle control device according to claim 6, wherein
   the first conductor comprises a first conducting portion disposed around an end of the groove.

8. The viewing angle control device according to claim 7, wherein
   the first conductor comprises a third conducting portion extending along the groove and disposed at an inner side or an outer side of the groove.

9. The viewing angle control device according to claim 6, further comprising a sealing member disposed between the first substrate and the second substrate and surrounding the liquid crystal layer,
   wherein the groove comprises a plurality of groove portions arranged along the sealing member, and an interruption portion is formed between two adjacent groove portions of the plurality of groove portions, and
   the first conductor comprises a second conducting portion disposed at the interruption portion.

10. The viewing angle control device according to claim 9, wherein
    the adjacent two groove portions and the interruption portion are arranged in a line along the sealing member.

11. The viewing angle control device according to claim 6, further comprising a sealing member disposed between the first substrate and the second substrate and surrounding the liquid crystal layer, wherein
    the first conductor comprises a fourth conducting portion disposed at an inner side of the groove and extending along part of the sealing member, and
    the fourth conducting portion is configured to protrude toward the second electrode.

12. The viewing angle control device according to claim 1, further comprising a power supply terminal configured to supply power to the first electrode,
    wherein the conductor is electrically connected to the power supply terminal.

13. A display panel comprising:
    the viewing angle control device according to claim 1; and
    an image display device configured to display an image and disposed to overlap the viewing angle control device.

14. The display panel according to claim 13, wherein
    the groove and the conductor are disposed outside a display area for displaying the image of the image display device.

15. A viewing angle control device comprising:
    a first substrate and a second substrate disposed so as to oppose each other;
    a first electrode and a second electrode respectively disposed on inner surfaces of the first substrate and the second substrate so as to oppose each other;
    a first alignment film disposed on an inner surface of the first electrode; and
    a liquid crystal layer disposed between the first substrate and the second substrate, wherein a groove is provided in a region of the inner surface of the first electrode, and a conductor, which is electrically connected with the first electrode and has a lower resistivity than the first electrode, is provided at the groove or at a periphery of the groove, and the conductor is a metal wire formed on the inner surface of the first electrode.

16. The viewing angle control device according to claim 15, wherein the metal wire is formed of copper or aluminum.

17. A viewing angle control device comprising:

a first substrate and a second substrate disposed so as to oppose each other;

a first electrode and a second electrode respectively disposed on inner surfaces of the first substrate and the second substrate so as to oppose each other;

a first alignment film disposed on an inner surface of the first electrode;

a liquid crystal layer disposed between the first substrate and the second substrate; and a sealing member disposed between the first substrate and the second substrate and surrounding the liquid crystal layer, wherein a groove is provided in a region of the inner surface of the first electrode, and a conductor, which is electrically connected with the first electrode and has a lower resistivity than the first electrode, is provided at the groove or at a periphery of the groove, the conductor comprises a first conductor disposed in a region where the groove is not formed, the groove comprises a plurality of groove portions arranged along the sealing member, and an interruption portion is formed between two adjacent groove portions of the plurality of groove portions, and the first conductor comprises a second conducting portion disposed at the interruption portion.

* * * * *